United States Patent [19]

Paynter

[11] Patent Number: 4,751,868
[45] Date of Patent: Jun. 21, 1988

[54] METHOD AND SYSTEM EMPLOYING DOUBLE-ACTING, FLUID-DRIVEN TWISTOR-PAIRS AS COMBINED JOINTS AND MOTORS IN ARTHROBOTS

[76] Inventor: Henry M. Paynter, 35 Scotland Rd., Reading, Mass. 01867

[21] Appl. No.: 828,770

[22] Filed: Feb. 12, 1986

[51] Int. Cl.$^4$ .............................................. F01B 19/00
[52] U.S. Cl. .......................................... 92/48; 92/71; 92/92; 91/520; 901/22; 901/28
[58] Field of Search ................ 92/34, 37, 40, 43, 48, 92/90, 92, 70, 71; 901/22, 28, 29; 91/520, 534, 536

[56] References Cited

U.S. PATENT DOCUMENTS

| 4,095,481 | 6/1978 | Kasai et al. | 901/28 X |
| 4,108,050 | 8/1978 | Paynter | 92/48 |
| 4,356,554 | 10/1982 | Susnjara et al. | 901/22 X |

FOREIGN PATENT DOCUMENTS

| 837845 | 6/1981 | U.S.S.R. | 901/22 |
| 1085802 | 12/1982 | U.S.S.R. | 901/22 |

Primary Examiner—Robert E. Garrett
Assistant Examiner—Mark A. Williamson
Attorney, Agent, or Firm—Parmelee, Bollinger & Bramblett

[57] ABSTRACT

The method and system employing double-acting, fluid-driven, twistor-pairs as combined flexural supports, joints, torque motors and linear-response angular deflectors in arms and legs of robots. Thus, the twistor-pairs at each joint advantageously serves as hinge or flexural support for the limb supported by the joint and simultaneously serves as double-acting turning motor for moving the portions of the arm or leg supported by the twistor pair. Various jointed-arm or jointed-leg robots, called "arthrobots" are shown embodying the invention. Controllably varying fluid pressure $P_1$ and $R_2$ (usually pressurized air) fed into elastic shells forming respective fluid chambers of a double-acting, twistor-pair at each joint, deflects a limb into predetermined predictable angular positions, depending upon these pressures. Costly friction-producing bearings are eliminated at joints and by eliminating bearings, mass, weight and inertia are substantially reduced, and frictional and torque drag effects are nearly eliminated. These benefits result in signifiant improvements in static and dynamic performance of arthrobots, and reduces costs of manufacture. The term "arthrobots" is used to place equal emphasis upon robots having jointed arms for manipulating objects, for example for light assembly tasks, and upon robots having multiple jointed legs for self-propelled locomotion. A six-legged, insect-like, self-propelled, walking robot ("hexapodal arthrobot") achieves locomotion with three legs always on the ground, providing advantageous, stable tripod support, by programming fluid pressures in twistor-pairs of respective joints varying in predetermined sequences.

15 Claims, 9 Drawing Sheets

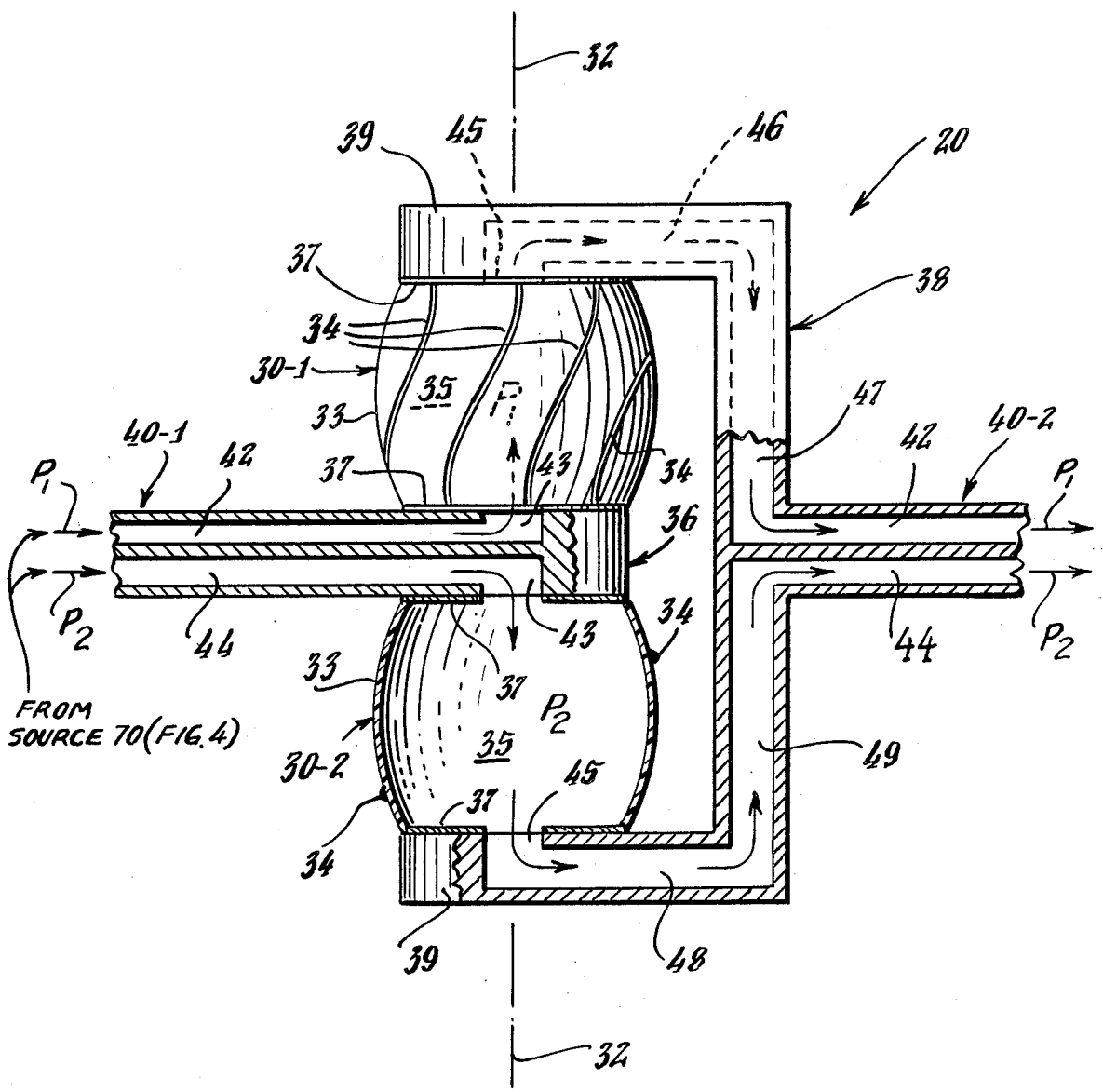

FRONT VIEW $P_1 = P_2$

SIDE VIEW

FRONT VIEW $P_1 > P_2$

SIDE VIEW

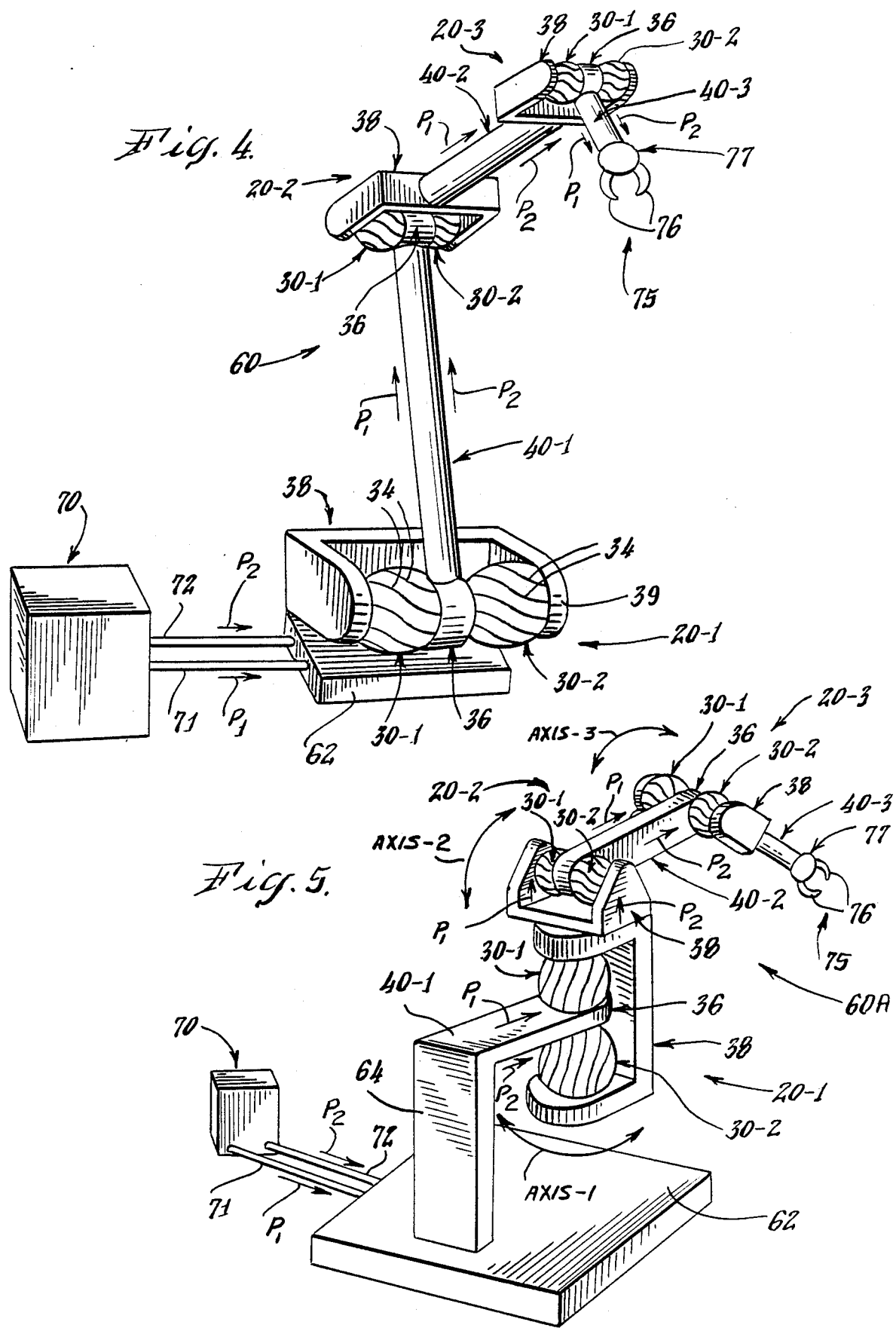

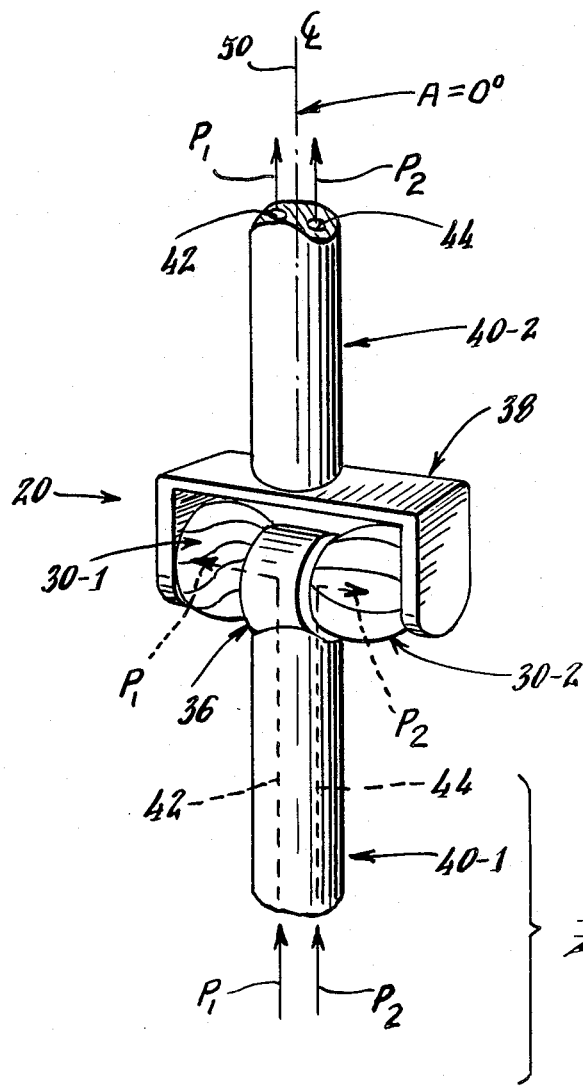
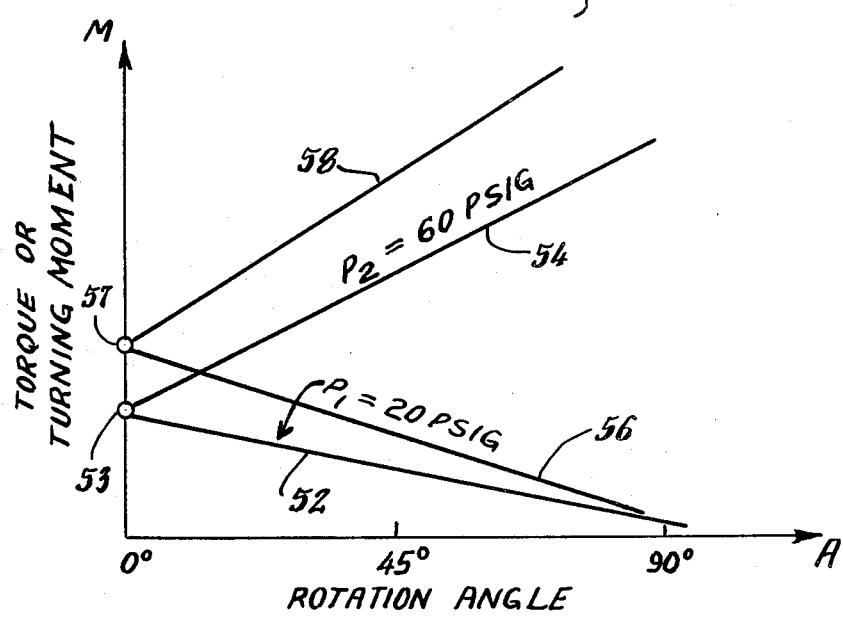
Fig. 6.

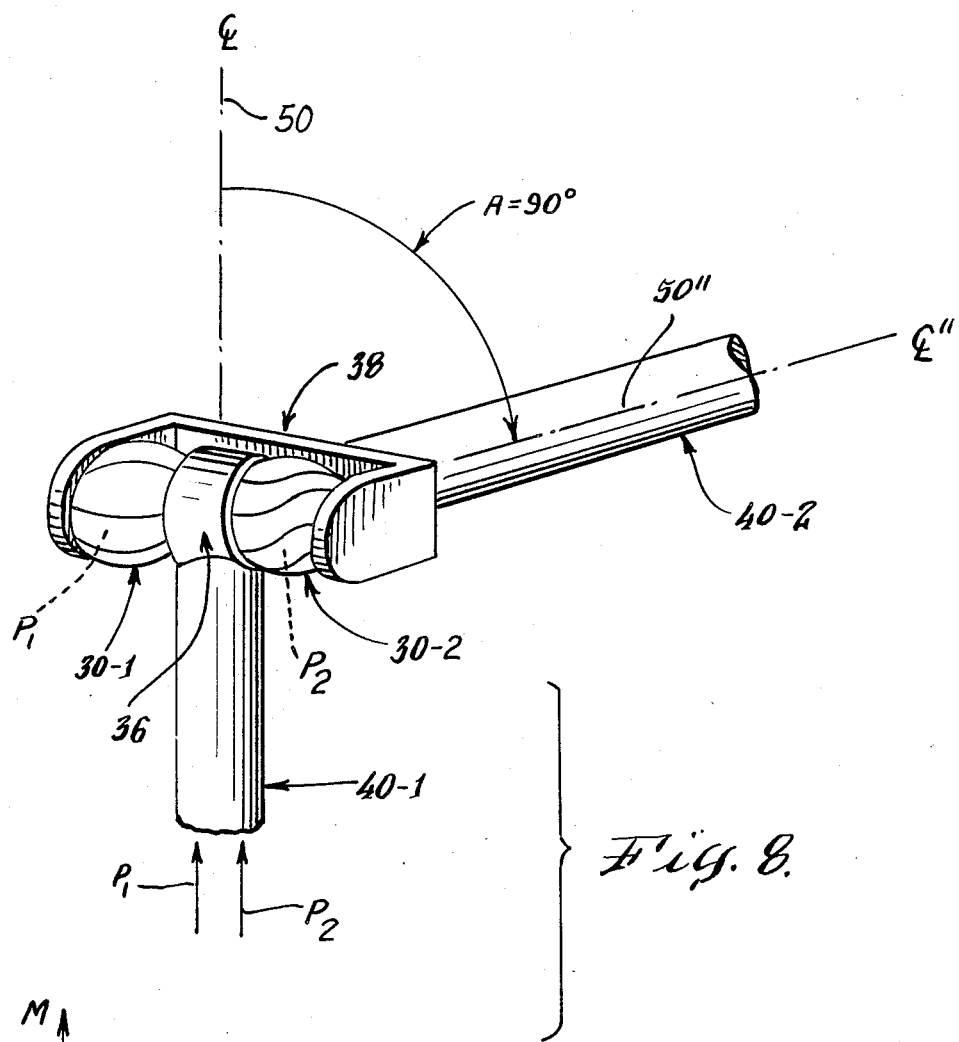
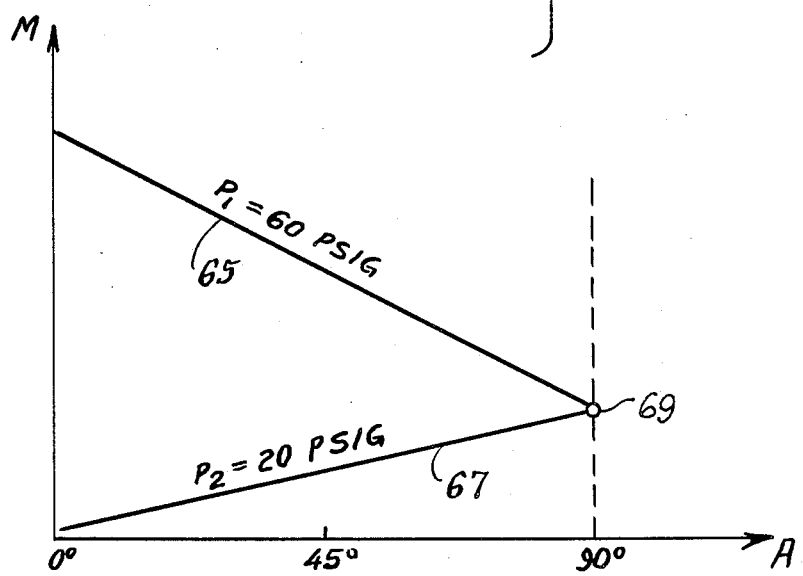
Fig. 8.

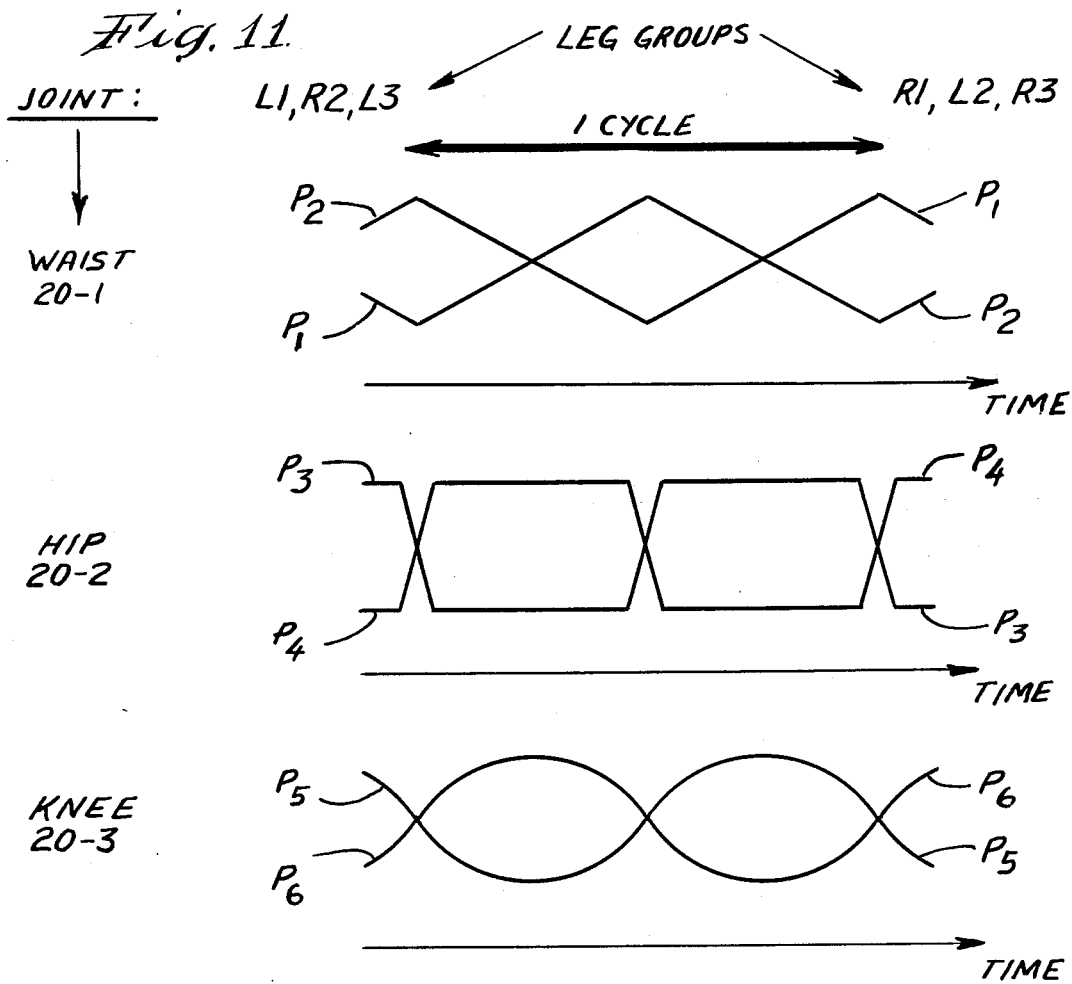
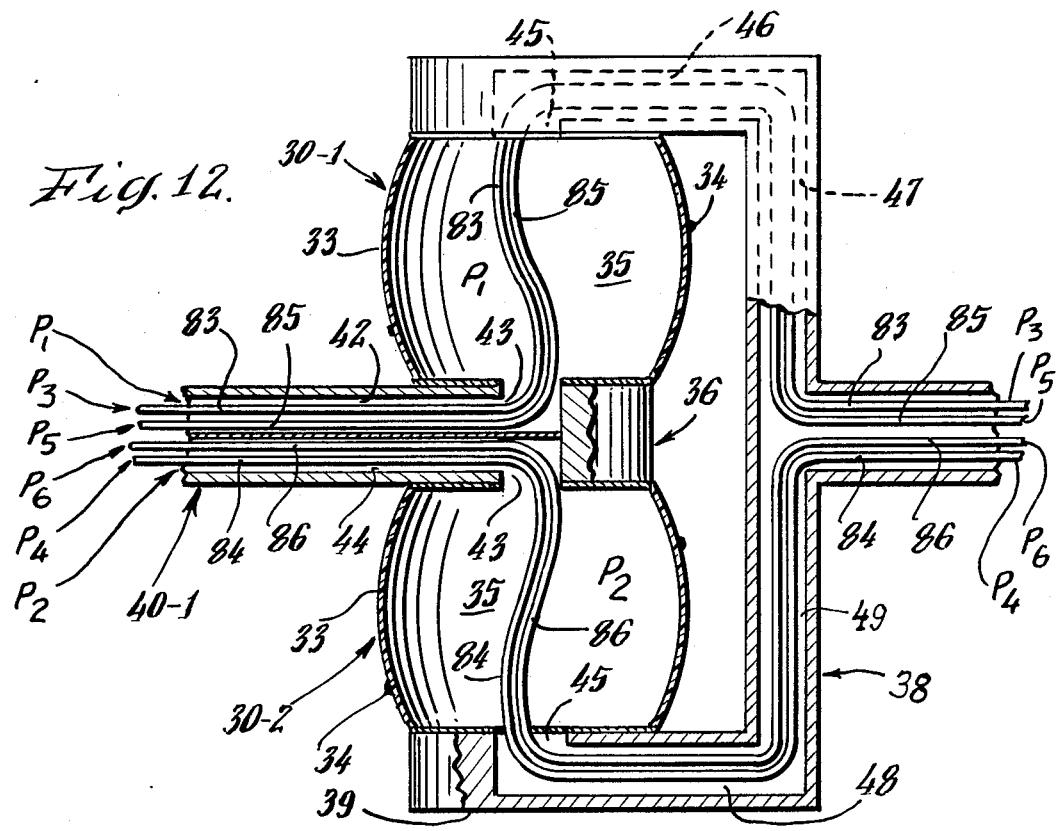

METHOD AND SYSTEM EMPLOYING DOUBLE-ACTING, FLUID-DRIVEN TWISTOR-PAIRS AS COMBINED JOINTS AND MOTORS IN ARTHROBOTS

FIELD OF THE INVENTION

The present invention is in the field of fluid-driven twistor-pairs which are double-acting and which turn into various angular positions in response to changes in pressure of the pressurized fluid being fed to the twistor-pair. One such twistor-pair is shown in FIG. 7 of U.S. Pat. No. 4,108,050 in my name as inventor, and the operating characteristics thereof are shown in FIGS. 8 and 9 of that patent, which is incorporated herein by reference. More particularly, this invention relates to a method and system employing such double-acting, fluid-driven twistor-pairs for serving as the hinge or flexural support for the limb (arm or leg) carried by the joint and simultaneously for serving as the double-acting turning motor for deflecting the jointed limb into various angular positions in response to changes in the pressure of the fluid (usually air) which is being fed into the two elastic shells which form respective fluid chambers of the twistor-pair.

The invention is in the field of ARTHROBOTICS.

SUMMARY OF THE DISCLOSURE

In order to place equal emphasis upon those types of robots having jointed arms, for use in manipulating objects, for example in light assembly tasks, and those other types of robots having jointed legs for self-propelled locomotion the term "arthrobot" is used. In the animal kingdom the largest phylum arthropoda includes the crustaceans, arachnids and insects. These arthropods all have jointed-legs (as well as exoskeletons). The phylum name derives from the Greek word for joint, (arthro) and for foot, (pod).

A six-legged, insect-like, self-propelled walking robot (hexapodal arthrobot) includes twistor-pairs in the various leg joints and is caused to walk by programming the fluid pressures in the twistor-pairs at the joints of the respective legs in a predetermined sequence. As a result of an advantageous and relatively simple pressure sequence, this six-legged arthrobot is caused to firmly plant three of its legs on the ground for providing stable ground support for this walking arthrobot while the other three legs are lifted and swing forward to an advanced position and are then lowered onto the ground for taking over their support role in their turn, while the first three legs are then swung forward to an advanced position, and so forth, for providing a stable and straight-line forward walking motion. By reversing the sequence a stable, straight-line reverse walking motion is produced.

Among the advantages of the present invention are those resulting from the fact that double-acting, fluid-driven, twistor-pairs serve as combined joints and torque motors in the arms and legs of the arthrobots. The twistor-pair at each joint simultaneously provide the flexural support and also provide the turning force for moving and positioning the portion of the limb which is supported by the joint.

Controllably varying the fluid pressures $P_1$ and $P_2$ (usually pressurized air) being fed into the two elastic shells which form the respective fluid chambers of a double-acting, twistor-pair causes the joint to move and to become deflected into predetermined predictable angular positions, as a linear function of the fluid pressure values. Since the deflection of the joint into different angular positions is predetermined and predictable, depending upon the two fluid pressures $P_1$ and $P_2$ in the interiors of the two shells of the twistor-pair which comprises each joint, an advantageous, uncomplicated, low-cost, open-loop dispatch control method and system can be employed utilizing modulated fluid pressures transmitted from the bodies of the arthrobots to operate their arms or legs for many different industrial applications and for various kinds of safe, lightweight, delightful toys.

Open-loop dispatch control of these arthrobots has attractive aspects in quickness of response and in stability of positioning of their jointed arms and legs. Changing fluid pressures in the respective fluid chambers of a double-acting twistor-pair rapidly deflects the jointed limb into the desired new position and very quickly the limb "settles down", i.e. stabilizes itself, in the new position. In contrast, many of the so-called modern robots have arms which move in a ponderous manner, and upon each change in position their closed loop control systems cause their arms to follow a "damped hunting" routine for a while before reaching a new stable equilibrium position. Their arms often act as if they had palsey. For example, their wrist position depends upon their elbow position which, in turn, depends upon their shoulder position, and thus a number of closed loop control circuits must become satisfied and stabilized before their arms stop hunting so as to achieve new stable equilibrium positions.

By virtue of eliminating the costly and friction-causing bearings which are required in arm joints of prior robots, the mass, weight and inertia of the jointed arms and jointed legs of the present arthrobots are substantially reduced and the torque drags caused by the frictional effects of such conventional bearings are nearly eliminated. Consequently, there are significant improvements in the static and dynamic performance of these arthrobots, and their costs of manufacture are relatively low.

At this point in the summary, it will be helpful to define and clarify a few terms:

"Twistor" or "twistor actuator" is intended to mean fluid-driven torsional actuators as described in my U.S. Pat. No. 4,108,050, which is referenced above, and in particular the torsional actuators as shown in FIG. 7 thereof, and whose operating characteristics are shown in FIGS. 8 and 9. Such a torsional actuator has an axis with a flexible, hollow, thin-walled elastomeric shell located around the axis and defining a fluid chamber with a plurality of inextensible flexible strands bonded to the shell and extending from one axial end of the shell to the other. When the pressure within the shell is reduced, its volume decreases and the inextensible strands can assume a progressively more twisted generally helical pattern about the axis. When the pressure within the shell is increased, its volume increases as the shell expands toward a generally spherical configuration, and these strands assume a progressively less twisted shape as they move toward a meridian arcuate pattern on the generally spherically configured bulging shell.

Two such twistors placed in spaced axial alignment on a common axis with their nearby ends connected to a central mechanical coupling member and with their inextensible strands all having the same sense of twist about the common axis and with their remote ends connected to an outer mechanical coupling member so that this combined pair of twistors act in opposed torque relationship, i.e. double-acting relationship, with respect to the central and outer coupling members is called a "twistor-pair".

Important novel differences are incorporated in the present twistors and twistor-pairs as compared with the disclosure in said patent. In the patent, one end of each torsional actuator was always shown and described as being mechanically blocked or plugged. Thus, pressurized fluid could communicate with the interior of the fluid chamber through only one end. Now, the twistors have ports at each end for enabling pressurized fluid to communicate with the interior of the fluid chamber through either port. Advantageously, the twistor shells are now conceived as being fluid conduits for enabling the pressurized fluid to flow into the fluid chamber through the port in one axial end and out through the port at the other axial end. For example, twistor-pairs at one joint now advantageously serve as a pair of separate conduits for feeding pressurized fluid at the respective different controlled pressures $P_1$ and $P_2$ to the downstream twistor-pairs forming other joints in the arm or leg which are located more remote from the body of the arthrobot.

Not only are these twistor-pairs serving as the flexural supports and torque motors at each joint, they are also serving as the fluid conduits for other twistor-pairs located at other joints nearer the extremities of the jointed limb of the arthrobot.

As used herein, the term "jointed limb" or "jointed limbs" is intended to be interpreted generally both singular and plural to include various types of jointed members mounted on a body such as jointed arms or legs and jointed appendages.

The terms "air" and "pneumatic" and "gaseous fluid" are intended to be interpreted broadly to include the various appropriate gaseous media capable of being economically employed to inflate tension actuators, for example air, mixtures of gases or individual gases, nitrogen, carbon dioxide, and the like.

BRIEF DESCRIPTION OF THE DRAWINGS

The various features, objects, aspects and advantages of the present invention will become more fully understood from a consideration of the following detailed description in conjunction with the accompanying drawings, which are not drawn to scale but are arranged for clarity of illustration. Corresponding reference numbers are used throughout the various FIGURES for indicating like elements in the various views and for indicating elements which perform corresponding functions even though their physical structures or shapes may be somewhat different in the various views.

FIG. 1 is a front elevational view of a twistor-pair, shown partially in section, forming a joint in a jointed limb of an arthrobot, and this twistor-pair is shown simultaneously providing three functions: (i) It is the flexural support for the limb. (ii) It is the torque motor for bending the joint into various angular positions. (iii) It is a dual conduit for separately conducting the fluid pressures $P_1$ and $P_2$ to twistor-pairs located further downstream nearer to the extremity of the jointed limb.

FIG. 4 is a perspective view of a twistor arthrobot embodying the invention and wherein there are three twistor-pair joints whose axes are parallel with each other.

FIG. 5 is a perspective view of another embodiment of a twistor arthrobot having three twistor-pair joints wherein the axes of the second and third joints are parallel to each other, and the axis of the first joint is perpendicular to the axis of the second joint. For example, angular twisting about axis 1 for turning from side to side may be considered as arthrobot waist movements; angular twisting about axis 2 for swinging the jointed limb up and down, or forward and backward, might be considered as shoulder joint or hip joint angular movements; and angular twisting about axis 3 for bending the limb might be considered as elbow joint or knee joint angular movements.

FIG. 6 is a perspective view of a twistor-pair joint together with plots of the two fluid pressures $P_1$ and $P_2$ for purposes of explaining the predetermined, predictable linear relationship of angular deflection as a function of $P_1$ and $P_2$.

FIG. 8 is a further perspective view of this twistor-pair joint which has now been deflected through an angle "A" of 90° as a result of further changes in the fluid pressures $P_1$ and $P_2$, as shown plotted.

FIG. 11 shows plots of the programmed cyclic changes in fluid pressures being fed to the twistor-pairs at the respective joints for producing the walking motion of the hexapodal arthrobot shown in FIG. 10.

FIG. 12 is a view similar to FIG. 1 showing how the various fluid pressures are conducted to the respective twistor-pair joints of the arthrobot of FIG. 10.

DETAILED DESCRIPTION OF PREFERRED EMBODIMENTS

Figure 2A:
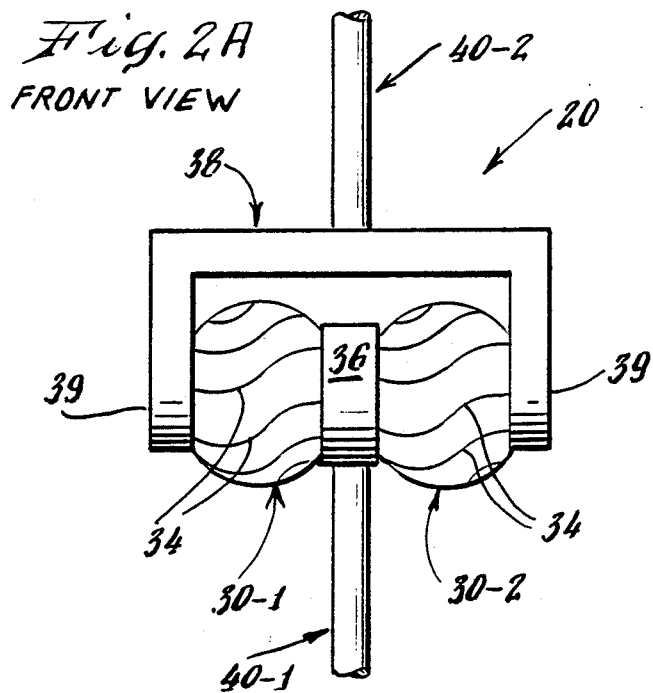
FIG. 2A is a front view of the twistor-pair joint shown in FIG. 1, except that in FIG. 2 this joint is shown on somewhat smaller scale, and the bar members of the jointed limb are shown extending vertically on the sheet for purposes of explanation. The fluid pressures $P_1$ and $P_2$ in the two twistors are shown being equal.

Inviting attention to FIG. 1, there is shown a twistor-pair joint, generally indicated at 20, including two fluid-driven twistors generally indicated at 30-1 and 30-2, respectively. Each of these twistors has an axis of twist which is in alignment with and concentric with the main (common) axis 32 of this twistor-pair joint. The twistor 30-1 is shown in elevation, while the second twistor 30-2 is shown in axial section. Each of these twistors 30 comprises a flexible, hollow, thin-walled elastomeric shell 33 positioned generally concentrically around the axis 32 with a plurality of inextensible, flexible strands 34 bonded to the shell 33 and extending from one axial end of the shell to the other axial end in a generally helical pattern about the axis 32. Each shell 33 defines a fluid chamber 35 therein for holding pressurized fluid, which is usually compressed air.

When the pressure within each shell 33 is reduced, its volume decreases and the inextensible strands 34 can assume a progressively more twisted generally helical pattern about the axis. When the pressure within each shell 33 is increased, its volume increases as the shell expands toward a generally spherical configuration, and these strands 34 assume a progressively less twisted shape as they move toward a meridian arcuate pattern on the generally bulging spherically configured shell.

The nearby ends of the two twistor shells 33-1, 33-2 and the nearby ends of the strands 34 are anchored in air-tight relationship to a central mechanical coupling member 36 of generally annular shape. For example, as shown, the shell and its strands are secured, as by bonding or cementing, to an annular end fitting 37 which, in turn, is attached, as by bonding or cementing, to the coupling member 36. The remote ends of these two twistor shells 33 and the remote ends of the strands 34 are anchored in air-tight relationship to an outer mechanical coupling member 38 of generally broad-U-shape. For example, as shown, the shell and its strands are secured, as by bonding or cementing, to an annular end fitting 37 which, in turn, is attached, as by bonding or cementing, to the two spaced legs 39 of the outer coupling member 38.

In order to cause the twistors 30 to act in opposed torque relationship so as to provide a double-acting torque action by the twistor-pair 20, the inextensible strands 34 in the two twistors 30 all have the same sense of helical twist about the common axis 32.

Figure 2B:
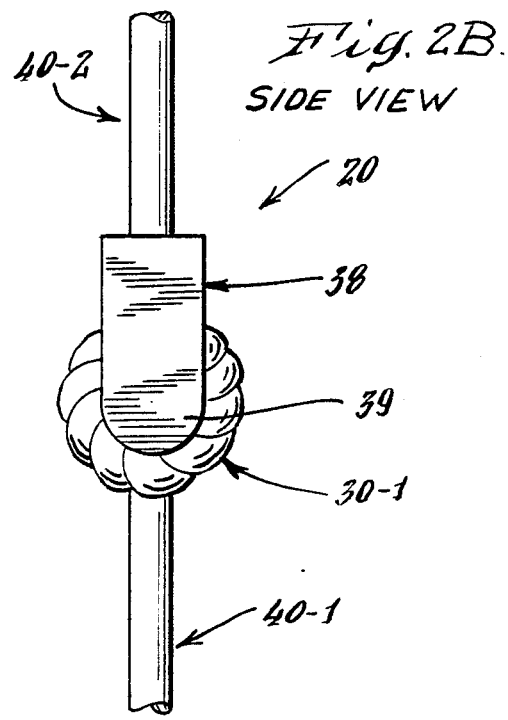
FIG. 2B is a side view of the twistor-pair joint of FIG. 2A.

As will be seen more clearly from FIGS. 2A and 2B such a twistor-pair joint 20 includes two shanks or bar elements 40-1 and 40-2 which are mechanically rigidly connected to the central and outer coupling members 36 and 38, respectively. The coupling members 36, 38 and these bar elements 40-1 and 40-2 are each formed of strong, lightweight material, for example of aluminium or fiber-reinforced plastic. Each bar element 40 is shown having the shape of a round rod, preferably of tubular configuration for minimizing weight, mass and inertia while maximizing rigidity. It is noted that these bar elements 40 can have any desired tubular cross-sectional configuration for optimizing strength and rigidity for resisting deflection under bending forces and axial compression, while minimizing weight, mass and inertia, and while providing at least two internal longitudinally extending passageways 42 and 44 (FIG. 1) which are isolated one from the other.

The first passageway 42 communicates through an inner end port 43 with the fluid chamber 35 within the first twistor 30-1, and the second passageway 44 communicates through another inner end port 43 with the fluid chamber 35 within the second twistor 30-2. Thus, two separate (isolated) flows of fluid under the respective pressures $P_1$ and $P_2$ can be fed directly into the two fluid chambers 35 of the twistor-pair 20 for inflating the respective twistors 30-1 and 30-2 at fluid pressures $P_1$ and $P_2$, as shown.

It is noted that these two twistors are providing the only flexural support between the inner and outer coupling members 36, 38. In other words, there is no bearing structure such as conventionally used in a joint which is capable of angular deflection. Also, there is no torque motor of conventional construction. The double-acting twistor-pair 20 is the fluid-driven torque motor, as will be explained later.

Further, these two twistors are being used in an advantageously novel manner to provide separate conduits for conducting the fluid pressures into the next successive bar element 40-2 for feeding these fluid pressures $P_1$ and $P_2$ to twistor-pair joints located further along the jointed limb in which the joint 20 is located. In accordance with this novel concept, there is an outer end port 45 (FIG. 1) at the outer end of each twistor 30-1, 30-2 which communicates with a respective passageway 46 or 48 in the respective spaced legs 39 of the outer coupling member 38. The passageway 46 communicates with a passageway 47 in the back portion of the U-shaped coupling member which communicates, in turn, with the longitudinally extending passageway 42 in the bar element 40-2. The other passageway 48 communicates with a back passageway 49 which feeds into the other longitudinally extending passageway 44 in bar element 40-2. Thus, the fluid pressures $P_1$ and $P_2$ are conducted to and through the passageways 42 and 44 in the bar element 42-2.

Therefore, it is emphasized, as described above, that this twistor-pair joint 20 is simultaneously providing three functions: (i) flexural support, (ii) torque motor, (iii) dual conduit for separately conducting fluid pressures $P_1$ and $P_2$. In addition, as will be explained more fully later, this twistor-pair joint provides a fourth function: (iv) of quickly responding in predetermined, predictable, and linear functional angular deflection relationship to the difference between the fluid pressures $P_1$ and $P_2$ dispatched from a remote source.

FIGS. 2A and 2B show a twistor-pair joint 20 in which the two shanks or bar elements 40-1 and 40-2 are deflected into a straight-line relationship when the fluid pressures $P_1$ and $P_2$ within the respective twistors 30-1 and 30-2 are equal.

Figure 3A:
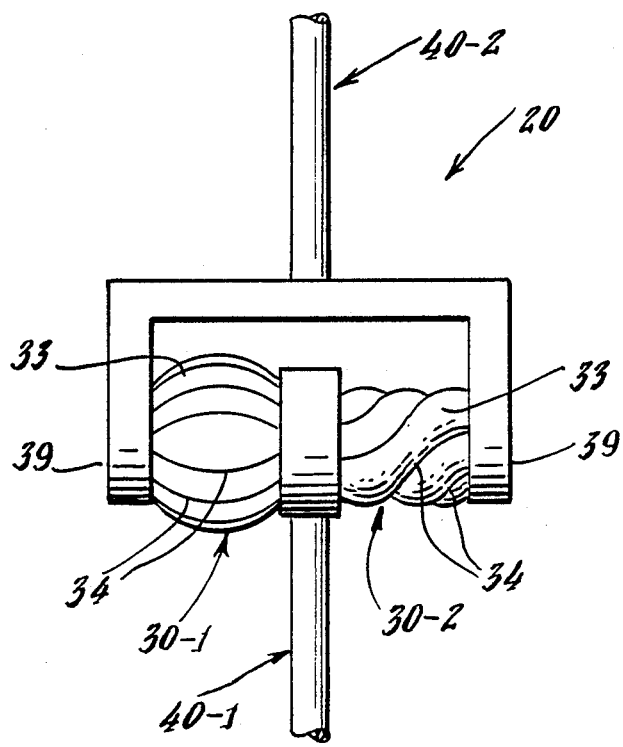
FIG. 3A is a front view of the twistor-pair joint of FIG. 2A, except that $P_1$ is shown greater than $P_2$, thereby causing the joint to become deflected.
Figure 3B:
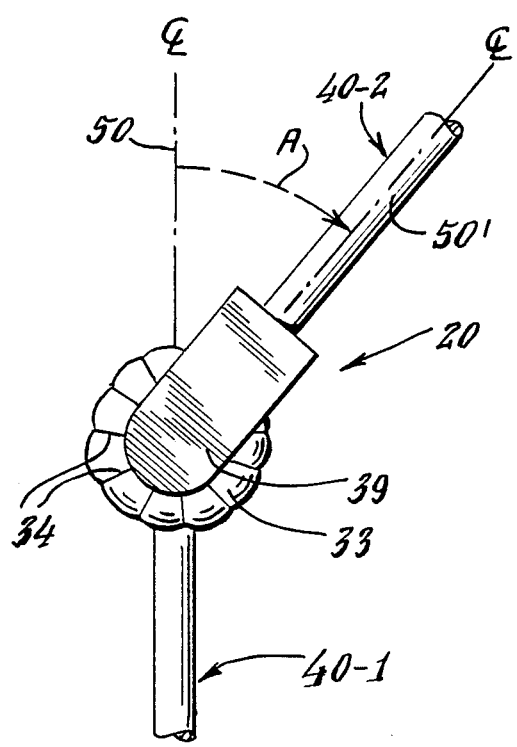
FIG. 3B is a side view of the deflected or bent joint of FIG. 3A for purposes of showing angular deflection A from the original center-line orientation.

FIGS. 3A and 3B show this same twistor-pair joint 20 with fluid pressure $P_1$ in twistor 30-1 considerably greater than $P_2$ in twistor 30-2, thereby causing the joint to be deflected through an angle A. The volume of the chamber within twistor 30-1 has increased, and its shell 33 has untwisted, causing the strands 34 to move toward meridian arcuate patterns on the now enlarged generally sperically configured shell 33, while the volume of the chamber within the other twistor 30-2 has decreased, and its shell 33 has become more twisted, causing the strands 34 to twist further about the axis in generally helical patterns. The angular deflection A of the joint 20 is measured between the initial position of the centerline 50 of the bar member 40-2 and the present position 50' of this angularly deflected centerline CL'.

It is to be noted that the fluid pressures $P_1$ and $P_2$ which have been discussed in connection with FIGS. 1, 2 and 3 can be provided and transmitted from any suitable, remotely located, controllable source of pressurized fluid 70 (FIG. 4), for example, from a controllable source of pressurized air such as shown in FIGS. 3 and 4 of my recently filed copending patent application Ser. No. 828-786 filed 2/12/86 and described in detail in the specification of said copending application. Advantageously, these two fluid pressures $P_1$ and $P_2$ which are being transmitted from a convenient remote location serve as open loop control signals being "dispatched" from a conveniently located remote control station. In other words, these fluid pressures $P_1$ and $P_2$ are functioning as control signals by virtue of the fact that each twistor-pair joint will respond by deflecting in a predictable, predetermined linear relationship with respect to the fluid pressures $P_1$ and $P_2$. When this remote controllable source includes one or more pneumatic bridges such as shown in FIGS. 3 and 4 of said copending application, then the first pressure $P_1$ is a common mode (or base) pressure $P_o$ plus or minus $\Delta P$ and the second pressure $P_2$ is $P_o$ minus or plus $\Delta P$, where $\Delta P$ is a pressure increment of the same magnitude above or below the common mode pressure $P_o$.

In FIG. 4 is shown a twistor arthrobot 60 having three twistor-pair joints 20-1, 20-2 and 20-3, all of whose axes happen to be parallel with each other. This robot 60 has a base 62, and the outer coupling member 38 of the first twistor-pair joint 20-1 is mounted upon the base 62. The movable inner coupling member 36 has a bar element or shank 40-1 extending therefrom.

The remote source of controllably pressurized fluid 70 is connected by flexible hose lines 71 and 72 carrying fluid under pressures $P_1$ and $P_2$, respectively, to the base 62 and thence into the passageways 46 and 48 (FIG. 1) of the outer coupling member 38. From these passageways 46 and 48 (not seen in FIG. 4), the fluid pressures $P_1$ and $P_2$ flow through the outer ports 45 (FIG. 1) into the fluid chambers 35 of the respective twistors 30-1 and 32-2, and thence through the inner ports 43 into the respective passageways 42, 44 in the bar element 40-1 in FIG. 4. In other words, the twistor-pair joint 20-1 in FIG. 4 is inverted from that shown in FIG. 1, and the pressurized fluid is flowing in the reverse direction through the twistor fluid chambers.

Thus, it will be appreciated that another feature of these twistor-pair joints 20 is that they are invertible, i.e. either the inner coupling member 36 or the outer coupling member can be connected directly or through a bar element 40 to a base or body 62. Thus, either of the ports 43 or 45 can be used to supply pressurized fluid into the twistor chamber 35, and conversely either of the ports 43 or 45 can be used to conduct the pressurized fluid downstream to the next bar element 40 rigidly leading to the next twistor-pair joint 20-2 (FIG. 4).

It is noted that the second twistor-pair joint 20-2 (FIG. 4) is inverted in its connection relationships with respect to the first joint 20-1, because the bar element 40-1 is serving as the dual output conduit from the inner coupling member 36 of the first joint and is also serving as the dual inlet conduit into the inner coupling member 36 of the second joint 20-1. In other words, the pressurized fluid flows passing through the second joint 20-2 (FIG. 4) are in the same relative directions as the flows are shown in the joint 20 of FIG. 1.

The outer coupling member 38 of the second joint 20-2, in turn, is rigidly connected by the bar element 40-2 to the outer coupling member 38 of the third twistor-pair joint 20-3. Thus, the third joint 20-3 is inverted in its connected relationships with respect to the second joint 20-2. Consequently, the fluid flows taking place in this third joint 20-3 are in the same relative directions as the fluid flows taking place in the first joint 20-1.

It will now be understood that in FIG. 4 all of the first twistors 30-1 in each joint 20-1, 20-2 and 20-3 contain pressurized fluid at substantially the same first pressure $P_1$, while all of the second twistors 30-2 in each of these joints contain pressurized fluid at substantially the same second pressure $P_2$. By controllably varying the pressures $P_1$ and $P_2$, these three joints 20-1, 20-2 and 20-3 will all simultaneously deflect in predictable predetermined angular positions which are linear functions of these pressures $P_1$ and $P_2$.

Each of these three twistor-pair joints 20-1-2-3 in FIG. 4 can be constructed to deflect by the same angular amount for a given set of supplied pressures $P_1$ and $P_2$; or any of these twistor-pair joints can be constructed to deflect by a predetermined angular amount more or less than the angular deflection of another twistor-pair joint for the given set of supplied pressures $P_1$ and $P_2$. The amount of deflection depends upon the amount of total helical twist established initially in the strands 34 of the two twistors 30-1 and 30-2 when their elastomeric shells are initially secured in air-tight relationship mounted between the inner and outer coupling members 36, 38 of the respective twistor-pair joint 20-1-2-3.

Mounted on the bar element 40-3 (FIG. 4) rigidly extending from the inner coupling member 36 of the third twistor-pair joint 20-3 is an end effector 75, which may be used as a hand or a foot depending upon the specific construction of this end effector. In this arthrobot 60 of FIG. 4, the end effector 75 includes a pair of opposed elements 76 which are operated by a twistor-pair (not shown) located in the gripper actuator 77. For example, one of the gripper elements 76 is mounted upon an inner coupling member of the twistor-pair in the actuator 77, and the other gripper element is mounted upon an outer coupling member for causing them to close or open depending upon the fluid pressures $P_1$ and $P_2$ conducted through the dual conduit bar element 40-3 which is connected to the pneumatic actuator 77.

If it is desired to operate the actuator 77 with third and fourth pressures $P_3$ and $P_4$, then the pressures $P_1$ and $P_2$ are not conducted through the outermost bar element 40-3, but instead there are a pair of flexible tubular hose lines (not shown) running from the source 70 through the interiors of the respective joints 20 and through the interiors of the bar elements 40 to the actuator 77, as will be explained in connection with FIG. 12. Alternatively, if desired, these tubular hose lines (not shown) for conducting the fluid pressures $P_3$ and $P_4$ to the actuator 77 can be run along the outside of the bar elements 40 by-passing the outside of the respective joints 20 with sufficient slack to permit full ranges of joint deflections.

The arthrobot 60A of FIG. 5 illustrates yet another feature of these twistor-pair joints 20 in that the outer coupling member 38 of a second joint 20-2 can be mounted in any desired position on the outer coupling member 38 of a first joint 20-1 for establishing any desired relationship between the turning AXIS 2 of the second joint and the turning AXIS 1 of the first joint. It will be understood that each such turning AXIS in FIG. 5 corresponds with the common axis 32 (FIG. 1) of a twistor-pair joint. For clarity of illustration in FIG. 5, a different labelling is used than in FIG. 1 for emphasizing that the angular deflection of a twistor-pair joint 20 takes place around the common axis 32 of FIG. 1.

In FIG. 5 there is a stanchion or body 64 mounted on the base 62, and a rectangular tubular bar element 40-1 extends from this body 64 to the inner coupling member 36 of the first joint 20-1. The various members 36 and 38 and the bar elements 40 have passageways therein for conducting the fluid pressures $P_1$ and $P_2$ supplied from the remote controllable source 70 to the respective twistor-pair joints 20-1, 20-2, 20-3. The pneumatic actuator 77 of the end effector 75 qan be supplied with fluid pressure in various ways as was described for the actuator 77 in FIG. 4.

It is to be noted in FIG. 5 that the second twistor-pair joint 20-2 is inverted in flow directions with respect to the first twistor-pair joint. Then, the third twistor-pair joint 20-3 is inverted with respect to the second, so that the relative flow directions are the same in the first and third joints.

In FIG. 6 the rotation angle "A" of a twistor-pair joint 20 is plotted along the abscissa, and the torque or turning moment M of this joint is plotted along the ordinate. The straight sloping line 52 is a plot of the torque (turning moment) exerted by the first twistor 30-1 when inflated at a fluid pressure $P_1$, of 20 pounds per square inch gage (i.e. 20 psi above atmospheric pressure taken at zero). The straight sloping line 54 is a plot of the torque exerted by the second twistor 30-2 when inflated at a fluid pressure $P_2$ of 60 psi gage. These two plots 52 and 54 of torque versus angle slope in opposite directions because the torques of these two twistors 30-1 and 30-2 are acting in opposition to each other. These two sloping lines intersect at point 53, whichxeans that their torques are equal and and opposite at this point 53, which happens to be at a deflection (or rotation angle) "A" equal to 0°. Therefore, the joint 20 quickly positions itself at this angle A equal to 0°, where the two twistor torques are equal and opposite at a difference in pressures $P_2$ and $P_1$ of 40 psi gage, assuming that no significant externally applied angular deflection force is being applied to the joint. This assumption about no significant externally applied angular deflection force is substantially achieved by using lightweight but strong components 36, 38, 40, as described above.

In order to explain further the operation of the joint 20, a sloping line 56 has been plotted for showing the torque versus angle of the first twistor 30-1 at an inflation pressure, for example, 30 psi gage. Another sloping line 58 shows the torque versus angle of the second twistor at an inflation pressure of, for example, 70 psi gage. The difference in inflation pressures for the two plotted lines 58 and 56 is 70 minus 30, which equals 40 psi gage, namely the same difference as for the other two plots 52 and 54. Consequently, these lines 56 and 58 intersect at point 57 which is located at a rotation angle A of 0°, which is the same as before.

These straight sloping lines 52, 56 and 54, 58 mean that the torque of each twistor 30-1 and 30-2 is a linear function of the joint rotation angle A for any given inflation pressure. Consequently, the angular deflection of the twistor-pair joint 20 is advantageously a linear function of the difference in the inflation pressures of the two twistors forming the opposed pair. In effect, each twistor 30-1 and 30-2 is acting like a linear torsion spring obeying Hooke's Law in that the resultant torque exerted by the spring (twistor) is directly proportional to the angular deflection of the spring (twistor).

When the inflation pressures are increased, as seen by comparing plot 56 and 52 and by comparing plot 58 with 54, each twistor advantageously continues to exhibit the desirable characteristic that its torque is a linear function of the joint rotation angle, but the slope of the straight-line plot is steeper. In effect, when pressure is increased, each twistor acts like a stiffer torsion spring. Consequently, the twistor-pair joint 20 supplied with respective fluid pressures providing opposed torques which intersect at 57 will act stiffer in resisting externally applied angular deflection loads than when the opposed torques intersect at 53.

It is noted that each of the twistors 30-1 and 30-2 follows the First Law of Thermodynamics that energy is conserved. Thus, the relationship is:

$$Pdv = MdA \quad (1)$$

The internal pressure P times the incremental change in volume dv equals the torque M times the incremental change in angular deflection dA.

Figure 7:
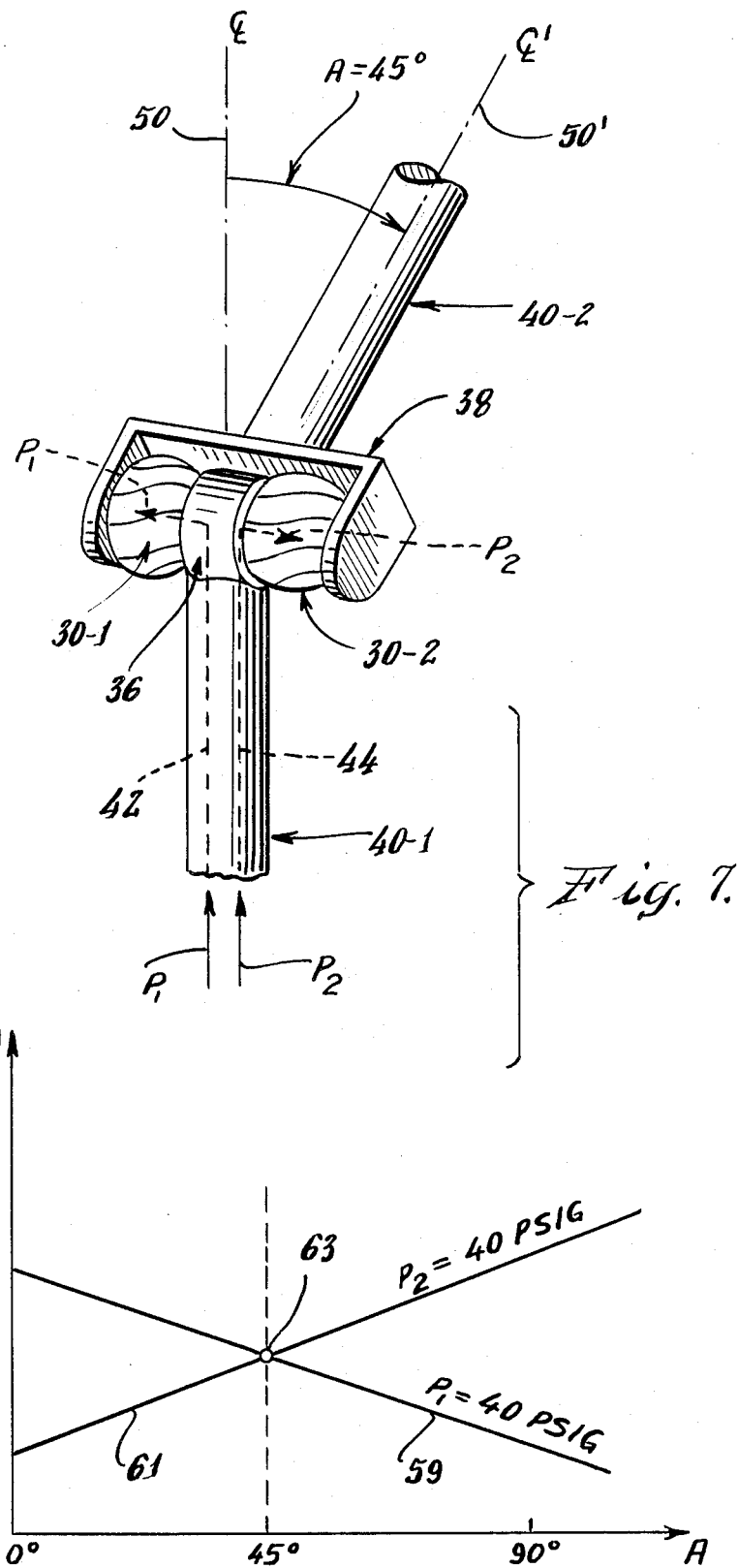
FIG. 7 is a perspective view of the twistor-pair joint of FIG. 6 which has been deflected through an angle "A" of 45° as a result of changes in the respective fluid pressures $P_1$ and $P_2$, as shown by their plots.

In FIG. 7 the two inflation pressures $P_1$ and $P_2$ are equal at 40 psi gage resulting in the straight line plots 59 and 61 which slope equally in opposite directions. These lines intersect at point 63, which happens to be at the deflection angle of 45° for this point. This angle A of 45° is measured between the initial position 50 of the centerline CL of the bar element 40-2 and its new centerline position 50'.

Since the two inflation pressures $P_1$ and $P_2$ are equal in FIG. 7, and since the two twistors 30-1 and 30-2 are essentially identical in construction, the amount of helical twisting of their shells 33 and strands 34 (FIG.1) is essentially identical. This is the mid-position for angular deflection of the joint 20.

In FIG. 8, $P_1$ has increased to 60 psi gage and $P_2$ has decreased to 20 psi gage, resulting in straight line plots 65 and 67 which intersect at point 69 corresponding to a rotation angle A of 90°.

Although FIGS. 6, 7 and 8 show rotation angles of 0°-45°-90°, it is to be understood that these angular values are just one example, depending upon the particular construction of the twistor-pair 30-1 and 30-2. Other examples are rotation angles of 0°-40°-80° or 0°-30°-60° or 0°-20°-40°, and so forth. These examples represent progressively smaller ranges of total angular deflection for the twistor-pair joint 20. If desired, the total range of angular deflection of the twistor-pair joint 20 can be increased, for example to provide rotation angles of 0°-50°-100° or 0°-60°-120° or 0°-70°-140° or 0°-80°-160°, and so forth. Also, one limit of angular deflection need not be placed at 0°, it can be established at any position, for example the rotation angles in FIGS. 6, 7 and 8 could be 35°-105°-175°, and so forth. Generally speaking, the upper limit on total angular travel is about 180° in order to avoid extreme twisting of the two twistor shells 33.

While it is generally true that all such double-acting twistor-pair joints will have only slight relative axial movement of the coupling members 36, 38 over a wide range of dimensional parameters, including axial lengths, shell diameters when fully inflated and twist angles (rotation angles A), this small relative axial movement can be essentially reduced to a zero value by designing each of the twistors in accordance with the specifications set forth in column 10, lines 38–53 of the referenced patent. Namely, the twistor shells are dimensioned and proportioned so as to exploit the counterbalancing simultaneous effects of arcuate "bowing" and "untwisting" of the flexible, inextensible strands 34. This optimum relationship occurs when the ratio of axial length of each shell 33 to its mid-diameter when fully inflated is approximately unity, and the shells have end diameters adjacent to their annular mounts 37 which are approximately one-half of their mid-diameter when fully inflated.

Figure 9:
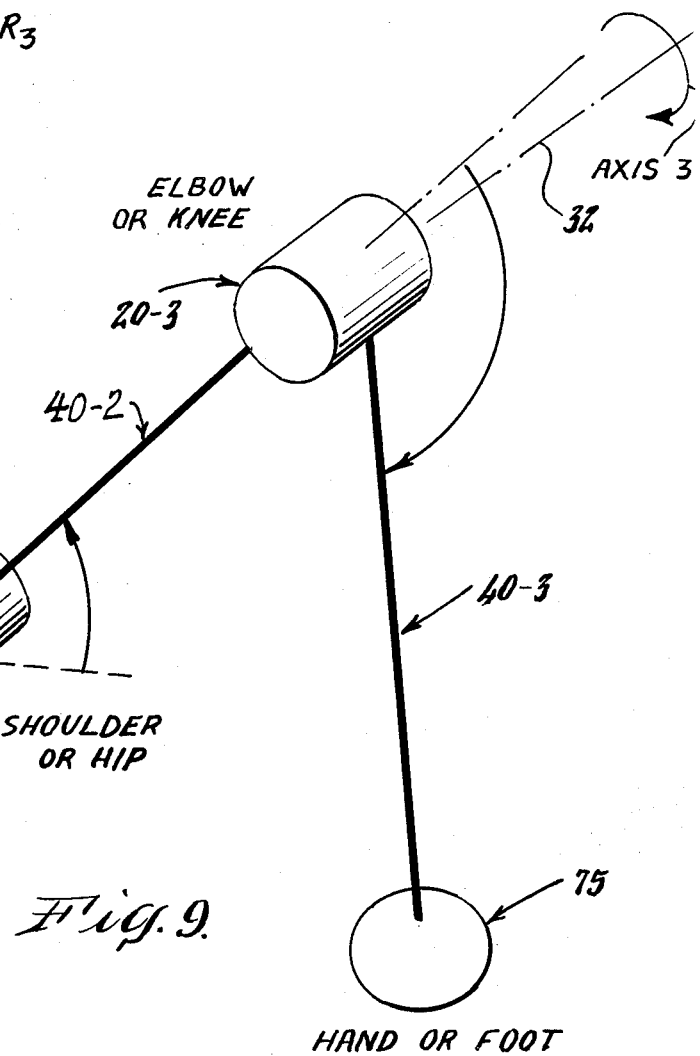
FIG. 9 is a diagram illustration of a jointed limb for showing correlations and similarities between the respective joints in an arm or a leg.

Inviting attention to FIG. 9, it is seen that for arthrobots, just as for vertebrates (including humans) the very same jointed limbs or jointed appendages which serve as "arms" can also serve as "legs". Thus, using familiar anthropomorphic terms, the following correspondence is observed:

| JOINTED-ARM | JOINTED-LEG |
|---|---|
| waist | waist |
| shoulder | hip |
| elbow | knee |
| wrist | ankle |
| hand | foot |

In FIG. 9 the respective joints are twistor-pair joints for the waist, shoulder or hip, and elbow or knee, being respectively numbered as 20-1, 20-2 and 20-3.

Figure 10:
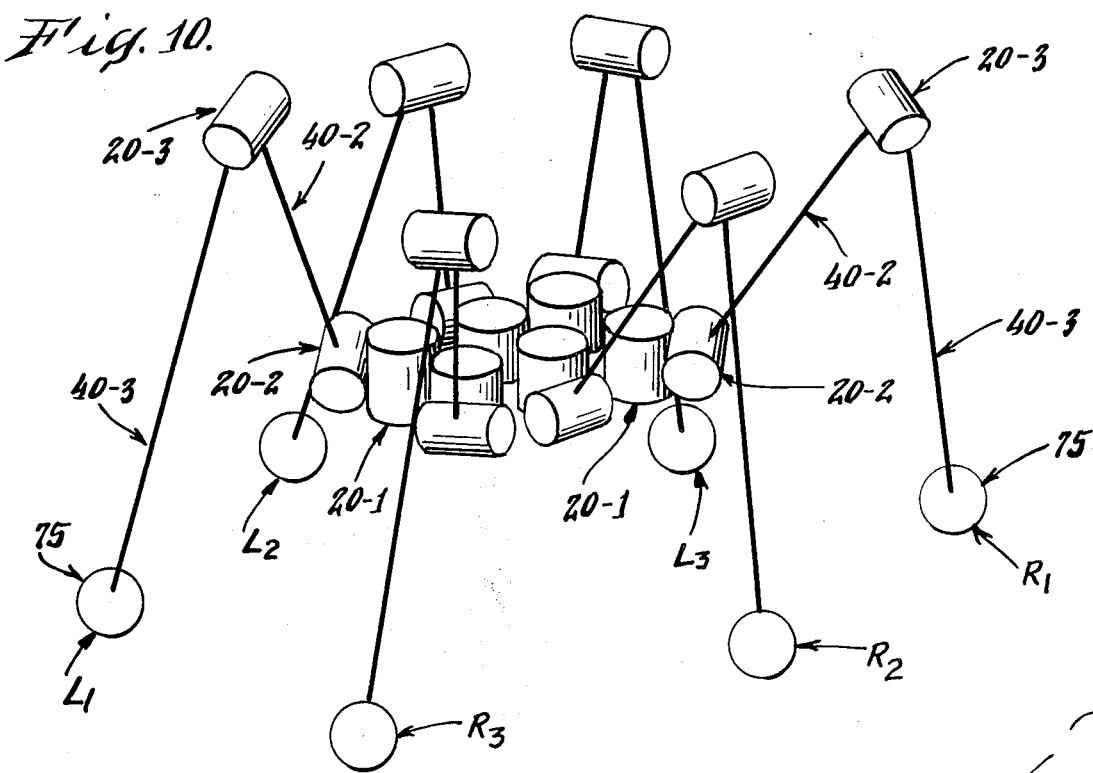
FIG. 10 is a perspective view of an artificial insect embodying the invention in the form of a hexapodal twistor arthrobot, and which is capable of self-propelled walking, thereby in smaller sixes making a delightful toy and also in larger sizes being capable of walking into environments which are inhospitable or dangerous to humans for performing tasks in such environments.

In FIG. 10 is a perspective view of an artificial insect hexapodal twistor arthrobot 80. Each of the six legs is constructed according to FIG. 9, so as to include three twistor-pair joints 20-1, 20-2 and 20-3. The waist axis 32 in FIG. 9 is vertical, like AXIS 1 in FIG. 5. The axis of the hip joint 20-2 is horizontal and the axis of the knee joint 20-3 is also horizontal respectively like AXIS 2 and AXIS 3 in FIG. 5. Therefore, FIG. 5 shows a physical structure including three twistor-pair joints 20-1, -2, -3 which can be used, if desired, for constructing each of the six legs in FIG. 10, except that the AXIS 2 must be offset from the AXIS 1, as shown in FIG. 9.

Hexapodal locomotion is quite distinctive in the feature that such arthrobots can always have precisely three feet planted firmly on the ground so as to serve as a momentary firm tripod. The legs move in a definite sequence following two rules:

1—No leg is raised until the leg just behind it is in a supporting position.
2—The movements of legs on corresponding opposite sides alternate.

Thus, in accordance with one embodiment of the invention, forward locomotion for the hexapodal twistor arthrobot 80 can be achieved by the following tabulated method, wherein the various terms are defined as follows:

LEG MOVEMENTS

Protracting means Legs moving Forward.
Retracting means Leg moving Backward.
Levated means Leg off of the ground.
Depressed means Leg on the ground.

| LEG DESIGNATIONS: | | |
|---|---|---|
| | LEFT LEGS | RIGHT LEGS |
| Front Leg | L1 | R1 |
| Mid Leg | L2 | R2 |
| Hind Leg | L3 | R3 |

SEQUENCING METHOD FOR

STRAIGHT FORWARD LOCOMOTION

| Levated & Protracting | L1 | R2 | L2 | R1 | L1 | R2 | ETC. |
|---|---|---|---|---|---|---|---|
| | L3 | | | R3 | L3 | | |
| Depressed & Retracting | L2 | R1 | L1 | R2 | L2 | R1 | ETC. |
| | | R3 | L3 | | | R3 | |
| | ←ONE CYCLE→ | | | | ←REPEAT— | | |

This sequencing method as tabulated above is produced by controllably varying the pressures being fed to the respective waist, hip and knee joints as a function of time as time as shown in FIG. 11.

As a result of this pressure sequencing, in FIG. 11, the arthropod 80 is always being supported and moved forward by three of its six legs, while the other three are lifted and swing forward to be put down at an advanced position, then taking over the support and forward moving action in their turn.

These six fluid pressures $P_1$, $P_2$, $P_3$, $P_4$, $P_5$ and $P_6$ can be provided from three pneumatic bridges of the type shown and described in connection with FIGS. 3 and 4 of above referenced copending application.

FIG. 12 shows how the six twistors in the waist, hip, and knee joints 20-1, -2 and -3, respectively, as scheduled in FIG. 11 receive these respective six pressures. Each hip joint 20-1 receives its pressures $P_1$ and $P_2$ through the two passageways 42 and 44 (FIG. 1) in the bar element 40-1 attached to the body portion 64 (FIG. 5) of the arthrobot 80 (FIG. 10). The flexible tubes 83 and 85 carrying fluid pressures $P_3$ and $P_5$, respectively, extend through the passageway 42 and extend in very slack relationship through the fluid chamber 35 of the first twistor 30-1. The port 45 is sealed around these tubes 83 and 85 to prevent the pressure $P_1$, from entering the passageway 46-47. These tubes 83 and 85 extend through the passageways 46 and 47 leading to the twistor pair hip joint 20-2, and the tube 83 communicates with the fluid chamber of the twistor 30-1 in the hip joint 20-2 for supplying fluid pressure $P_3$ thereto. The remaining tube 85 extends in very slack relationship through the fluid chamber of this twistor and is sealed in the port where this remaining tube 85 exits from the chamber for preventing the fluid pressure $P_3$ from escaping through the sealed port. Then this tube 85 communicates with the chamber of the final twistor 30-1 in the knee joint 20-3 for supplying fluid pressure $P_5$ thereto.

Similarly, there are two flexible tubes 84 and 86 carrying fluid pressures $P_4$ and $P_6$, respectively, extending through the passageway 44 and extending in very slack relationship through the fluid chamber 35 of the second twistor 30-2. The port 45 is sealed around these tubes 84 and 86 to prevent the pressure $P_2$ from entering the passageway 48-49. These tubes 84, 86 extend through the passageways 48, 49 leading to the twistor-pair hip joint 20-2, and the tube 84 communicates with the fluid chamber of the twistor 30-2 in the hip joint 20-2 for supplying fluid pressure $P_4$ thereto. The remaining tube 85 extends in very slack relationship through the fluid chamber of this twistor and is sealed in the port where this remaining tube 86 exits from the fluid chamber for preventing the fluid pressure $P_4$ from leaking through the sealed port. Then, this remaining tube 86 communicates with the chamber of the final twistor 30-2 in the knee joint 20-3 for supplying fluid pressure $P_6$ thereto.

It will be understood that flexible insulated wires can be internally strung through the twistor chambers and passageways like the flexible air tubes 83, 85, 84, 86. Such wires can be run to sensors at the end effector 75, at the hand or foot, and to angle encoders at the respective joints if desired. Instead of running such flexible air tubes internally, they can be run externally along the bar members and by-passing the respective joints with sufficient slack to avoid restricting angular deflection of the joint.

Figure 13:
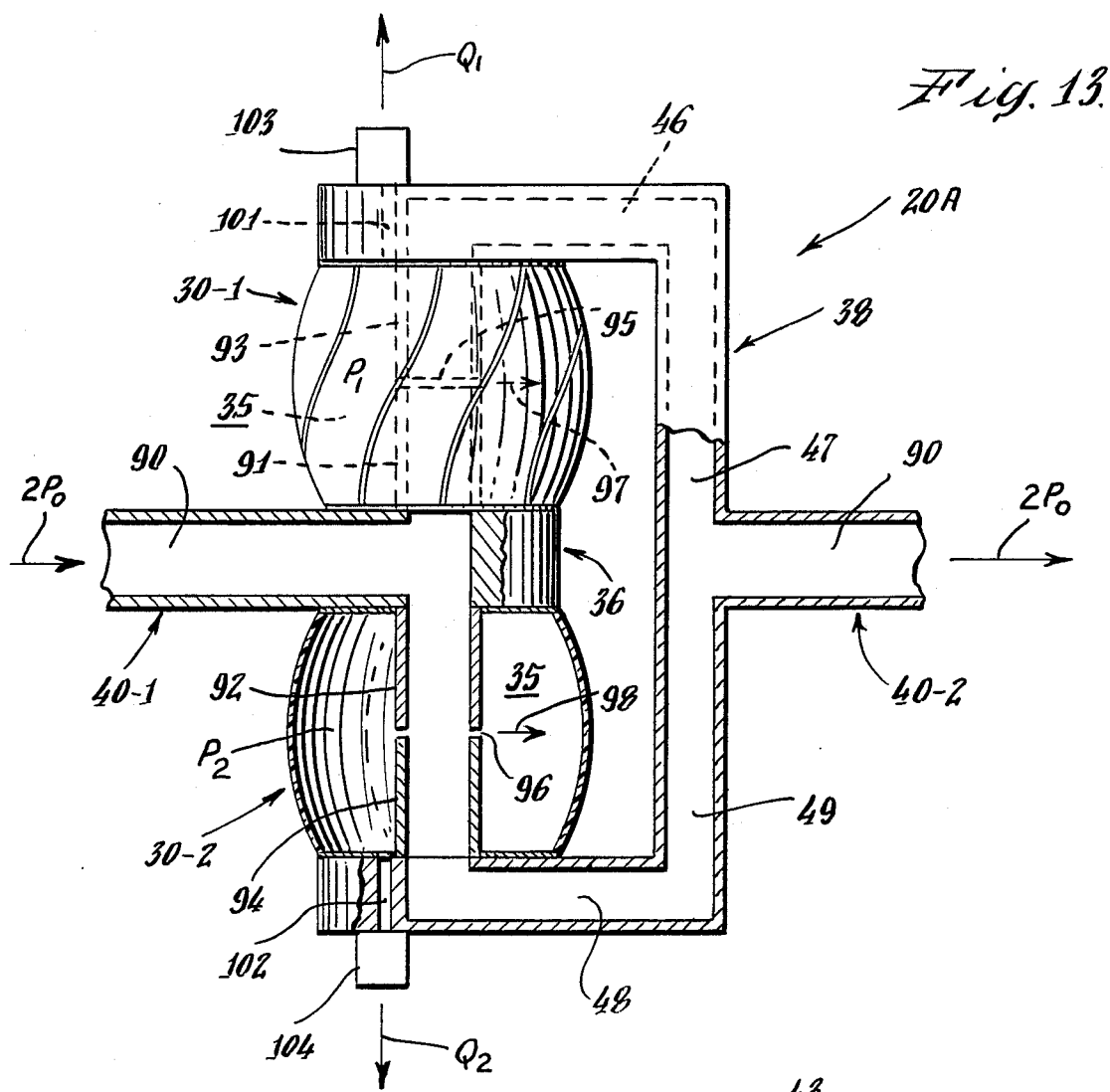
FIG. 13 is another view similar to FIG. 1 showing how the various fluid pressures in such twistor-pair joints can be locally generated at the respective twistor-pair joints.

In FIG. 13 is shown a control system for a twistor-pair joint 20A wherein the control pressures are generated locally at this joint by employing a pneumatic bridge arrangement analogous to those as described in the referenced copending application. A supply pressure of $2P_o$ is fed through the passageway 90 in the tubular bar element 40-1 leading into mounted sleeves 91, 92 which extend into the middle of the respective fluid chambers 35. There are two other sleeves 93 and 94 connected to the other ends of the respective twistor. The inner ends of the respective pairs of sleeves 91, 93 and 92, 94 are closely spaced for defining narrow pressure-dropping bleed orifices 95 and 96, respectively, feeding into the fluid chambers 35 as shown by the arrows 97 and 98.

The main flow of the fluid pressure $2P_o$ passes through the aligned pairs of sleeves 91-93 and 92-94 and passes through the passageways 46-47 and 48-49 leading into the passageway 90 in the tubular bar element 40-2 feeding to the next twistor-pair joint for supplying the fluid pressure $2P_o$ to the next joint.

In order to provide the desired controlled pressures $P_1$ and $P_2$ in the chamber 35, there are bleed orifices 101 and 102 leading to atmosphere through electrically controlled bleed valves 103 and 104, respectively, thereby bleeding controllable qualities $Q_1$ and $Q_2$ per unit time of pressurized fluid from the respective chambers 35. These electrically controlled bleed valves may h=similar to those as described in the copending application. Thus, the chamber pressure $P_1$ can be made equal to $P_o$ plus or minus $\Delta P$, and the chamber pressure $P_2$ can be made equal to $P_o$ minus or plus $\Delta P$, where $\Delta P$ are equal increments above and below $P_o$, in the manner of a pneumatic bridge as explained in said application, by varying $Q_1$ and $Q_2$.

As an example, $2P_o$, the initial supply pressure, may have any desired value in the range from 10 psi gage up to 150 psi gage, depending upon the burst strength of the twistors 30. For example, a convenient source of pressurized fluid is clean, filtered and demoisturized "shop air" at about 90 to 110 psi gage.

Figure 14:
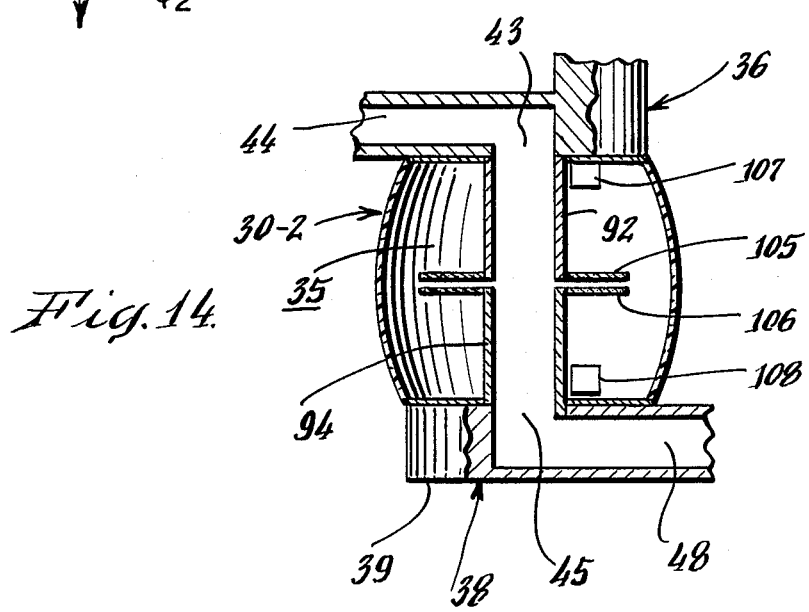
FIG. 14 is a view of a portion of the joint of FIG. 13 showing how the angle of rotation can be sensed and encoded.

If desired to encode the angle of rotation of the twistor-pair joint 20A, then as J,zHJ,zHJ,zHJ,zH in FIG. 14, a pair of transparent plastic discs 105 and 106 with opaque radial lines are connected to the adjacent ends of the two sleeves 92 and 94. Since these sleeves 92 and 94 are connected to the respective inner and outer coupling members 36 and 38, the relative turning of the discs 105 and 106 corresponds to the rotation angle A of the joint 20A. Suitable sensors 107 and 108, for example a light source and a photocell, sense the relative angular movements of the radial lines on the discs 105, 106 for sensing and encoding the joint rotation angle A.

While the novel features of the invention have been illustrated and described in connection with specific embodiments of the invention, it is believed that these embodiments will enable others skilled in the art to apply the principles of the invention in forms departing from the exemplary embodiments herein, and such departures are contemplated by the appended claims and equivalents of the claimed elements.

I claim:

1. A twistor-pair joint for use in the jointed limb of a robot comprising:

first and second twistors each having respective first and second flexible, hollow, thin-walled elastomeric shells extending around an axis in generally concentric relationship about the axis, said first hollow elastomeric shell defining a first fluid chamber within said first shell with a plurality of relatively inextensible flexible strands associated with said first shell and extending from one axial end of said first shell to the other, said second hollow elastomeric shell defining a second fluid chamber within said second shell and with a plurality of relatively inextensible flexible strands associated with said second shell and extending from one axial end of said second shell to the other, said first and second twistors being placed in spaced axial alignment with their respective axes being concentric with a common axis providing nearby axial ends and remote axial ends of said twistors, said nearby axial ends of said first and second twistors being connected to a central mechanical coupling member, said remote axial ends of said first and second twistors being connected to an outer mechanical coupling member for forming a twistor pair, said strands in both of said twistors having the same sense of generally helical twist about said common axis and with their ends connected to said inner and outer coupling members for causing changes in pressure in said first and second fluid chambers to cause said first and second twistors to act in opposed torque relationship on inner and outer coupling members, one of said coupling members being mounted on support means and the other coupling member having a bar element rigidly connected thereto and extending generally radially with respect to said common axis forming a shank portion of a joined limb, said nearly and remote axial ends of said first and second twistors each having a port therein communicating with the fluid chamber within the respective twister for allowing fluid communication to occur with the fluid chamber of each twistor at both ends of each fluid chamber, thereby comprising four of said ports, said support means and said one coupling member mounted on said support means defining first and second fluid-conducting passageways, said first fluid-conducting passageway communicating through one of said ports with said first fluid chamber, said second fluid-conducting passageway communicating through a second of said ports with said second fluid chamber, said bar element and said other coupling member connected thereto defining third and fourth fluid-conducting passageways, said third fluid-conducting passageway being connected through a third of said ports with said first fluid chamber at the opposite axial end of said first fluid chamber from said first port for said first fluid-conducting passageway to communicate with said third fluid-conducting passageway through said first fluid chamber, said fourth fluid-conducting passageway being connected through the fourth of said ports with said second fluid chamber at the opposite axial end of said second fluid chamber from said second port for said second fluid-conducting passageway to communicate with said fourth fluid-conducting passageway through said second fluid chamber, whereby said twistor pair serves as a flexural joint and torque motor between said support means and said bar element for angularly positioning said bar element relative to said support means in response to first and second pressures of pressurized fluid fed into said first and second fluid chambers through said first and second fluid-conducting passageways, and whereby said first and second fluid passageways serve for feeding said first and second pressures of pressurized fluid into said third and fourth fluid-conducting passageways, respectively, for feeding to another twistor pair at a remote end of said bar element.

2. A twistor-pair joint as claimed in claim 1, and wherein:

said first and second fluid-conducting passageways in said support means communicate through said central coupling member with the respective ports in the nearby axial ends of said first and second twistors connected to said central coupling member for supplying fluid at first and second pressures $P_1$ and $P_2$ into the respective first and second fluid chambers within said first and second twistors, and said third and fourth fluid-conducting passageways in said bar element communicate through said outer coupling member with the respective ports in the remote axial ends of said first and second twistors connected to said outer coupling member for feeding fluid at said first and second pressures $P_1$ and $P_2$ from said first and second fluid chamers of the first and second twistors into the respective third and fourth fluid-conducting passageways, thereby causing said first and second fluid chambers respectively to serve as first and second conduits for conducting fluid at pressure $P_1$ from said first fluid-conducting passageway into said third fluid-conducting passageway and for conducting fluid at pressure $P_2$ from said second fluid-conducting passageway into said fourth fluid-conducting passageway.

3. A twistor-pair joint as claimed in claim 1, in which:

said first and second fluid-conducting passageway in said support means communicate through said outer coupling member with the respective ports in the remote axial ends of said first and second twistors connected to said outer coupling member for supplying fluid at first and second pressures $P_1$ and $P_2$ into the respective first and second fluid chambers within said first and second twistors, and said third and fourth fluid-conducting passages in said bar element communicate through said central coupling member with the respective ports in the nearby axial ends of said first and second twistors connected to said central coupling member for feeding fluid at said first and second pressures $P_1$ and $P_2$ from said first and second fluid chambers of the first and second twistors into the respective third and fourth fluid-conducting passageways, thereby causing said first second fluid chambers respectively to serve as first and second conduits for conducting fluid at pressure $P_1$ from said first fluid-conducting passageway into said third fluid-conducting passageway and for conducting fluid at pressure $P_2$ from said second fluid-conducting passageway into said fourth fluid-conducting passageway.

4. A twistor-pair joint as claimed in claim 1, in which:

a pair of sleeves are positioned in axial alignment within each of the first and second chambers of said respective first and second twistors, said sleeves are mounted in the respective ports of the respective fluid chamber and extend axially toward each other, said sleeves define respective conduits extending axially through said chambers, the adjacent ends of said pair of sleeves in each chamber are closely spaced for defining respective bleed openings for bleeding pressurized fluid into the respective chamber, and controllable bleed means for controllably bleeding pressurized fluid from the respective chamber into the atmosphere for prodcuing variable pressure within the respective chambers for controlling deflection of the joint.

5. A twistor-pair joint as claimed in claim 1, in which:

angular deflection sensing means are positioned within one of the fluid chambers and are coupled to the respective axial ends of the fluid chamber for sensing the relative angle of twist between the two axial ends.

6. A jointed limb of an arthrobot comprising:

first and second bar elements extending longitudinally along the jointed limb and forming first and second shank portions of the jointed limb, a twistor-pair joint interconnecting said first and second bar elements, said twistor-pair joint including a central coupling member rigidly connected to one of said bar elements and an outer coupling member rigidly connected to the other of said bar elements, said twistor-pair comprising first and second twistors, said first and second twistors having first and second fluid chambers therein, respectively, and said first and second twistors being positioned on a common axis in spaced axial alignment with their nearby axial ends connected to opposite sides of said central coupling member and with their remote axial ends connected to opposite sides of said outer coupling members, said twisors having the same sense of generally helical twist about said comon axis for causing the first and second twistors to act in torque opposite on said coupling members, said nearby axial ends of said first and second twistors having first and second ports therein communicating respectively with said first and second fluid chambers, said remote axial end of said first and second twistors having third and fourth ports therein communicating respectively with said first and second fluid chambers, said one bar element having separate first and second longitudinally extending passageways therein communicating through said centnral coupling member and through the respective first and second ports with the respective first and second fluid chambers, said other bar element having separate third and fourth longitudinallly extending passageways therein communicating through said outer coupling member and through the respective third and fourth ports with the respective first and second fluid chambers, by virtue of all of which said twistor-pair joint serves simultaneously as (i) the flexural support between said first and second bar elements, (ii) the torque motor between said first and second bar elements for angularly positioning said first and second bar elements inr esponse to pressures of pressurized fluid in said first and second fluid chambers, and (iii) as respective separate conduits for interconnecting the first and third passageways and the second and fourth passageways for conducting pressurized fluid between said first and third passageways and for conducting pressurized fluid between said second and fourth passageways.

7. A jointed-limb as claimed in claim 6, in which:
said one bar element is supported by support means connected to said one bar element at a location remote from said twistor-pair joint, and
a source of pressurized fluid under controllable pressure communicates through said support means with said first and second passageways for feeding fluid at pressures $P_1$ and $P_2$ through said first and second fluid chambers of said first and second twistors into said third and fourth passageways, respectively.

8. A jointed-limb as claimed in claim 6, in which:
said other bar element is supported by support means connected thereto at a location remote from said twistor-pair joint, and
a source of pressurized fluid under controllable pressure communicates through said support means with said third and fourth passageways for feeding fluid at pressures $P_1$ and $P_2$ through said first and second fluid chambers of said first and second twistors into said first and second passageways, respectively.

9. A jointed-limb in an arthrobot comprising:
a first twistor-pair joint,
a second twistor-pair joint,
each of said twistor-pair joints including central and outer coupling members,
means for supporting the jointed-limb connected to one of the coupling members of the first twistor-pair,
a first bar element rigidly connected from the other coupling member of first twistor-pair to one of the coupling members of the second twistor-pair joint,
a second bar element rigidly connected to the other coupling member of the second twistor-pair joint and projecting therefrom,
said supporting means, said central and outer coupling members and said first and second bar elements each including a first and a second passageway which are separate from each other and which provide communication along the jointed arm for two separated flows of pressurized fluid, and said first and second twistor-pair joints each including a pair of double-acting twistors having two fluid chambers therein, each of the two fluid chambers having two ports, one of the two ports communicating with one end of the fluid chamber and the other port communicating with the other end of the fluid chamber, and
one of said two chambers and its two ports forming respective portions of the first passageway and the other of said two chambers and its two ports forming respective portions of the second passageway.

10. A jointed-limb as claimed in claim 9, in which:
the axes of the first and second twistor pair joints are offset from each other and are oriented at right angles to each other for forming a waist joint and a hip joint.

11. A jointed limb as claimed in claim 9, in wh ich:
said means for supporting the jointed-limb is a third twistor-pair joint having central and outer coupling members, and
said outer coupling member is connected to the outer coupling member of the first twistor-pair joint for carrying said first twistor-pair joint on the outer coupling member of the third twistor-pair joint.

12. The method of controlling a jointed limb in an arthrobot including at least one jointed limb including first and second twistor-pair joints spaced from each other and connected by a bar element in the limb comprising the steps of:
remotely generating pressurized fluid at two pressures $P_1$ and $P_2$,
feeding the fluid pressure $P_1$ into one of the twistors in said first joint and through said one twistor and through said bar element into one of the twistors in said second joint,
feeding the fluid pressure $P_2$ into the other twistor in said first joint and through said other twistor and through said bar element into the other twistor in said second joint, and
controllably varying the pressures $P_1$ and $P_2$ for simultaneously achieving open loop control of both of said twistor-pair joints.

13. The method of controlling the deflection of a twistor-pair joint interconnecting first and second bar elements, said twistor-pair joint having first and second fluid chambers comprising the steps of:
supplying pressurized air from a remote source and feeding the pressurized air along said first bar element into the vicinity of said first and second chambers in the joint,
bleeding the pressurized air separately from said vicinity into said first and second fluid chambers of said twistor-pair joint,
controllably and separately bleeding pressurized air from said first and second chambers into the atmosphere for locally generating variable and differing fluid pressure within said first and second chambers for controlling angular deflection of the twistor-pair joint, and
feeding the pressurized air from said vicinity along said seocnd bar element to another twistor-pair joint.

14. A jointed-limb in an arthrobot comprising:
a first twistor-pair joint,
a second twistor-pair joint,
each of said twistor-pair joints including central and outer coupling members,
means for supporting the jointed-limb connected to one of the coupling members of the first twistor-pair,
a first bar element rigidly connected from the other coupling member of the first twistor-pair to one of the coupling members of the second twistor-pair joint, a second bar element rigidly connected to the other coupling member of the second twistor-pair joint and projecting thereform, said supporting means, said central and outer coupling members and said first and second bar elements each including a first and a second passageway which are separate from each other and which provide communication along the jointed arm for two separated flows of pressurized fluid, and said first and second twistor-pair joints each including a pair of double-acting twistors each having fluid chamber therein, with the two chambers in each joint forming respective portions of the first and second passageways, and a plurality of flexible air lines extending through the first and second passageways.

15. A jointed-limb in an arthrobot comprising:

a first twistor-pair joint, a second twistor-pair joint, each of said twistor-pair joints including central and outer coupling members, means for supporting the jointed-limb connected to one of the coupling members of the first twistor-pair, a first bar element rigidly connected from the other coupling member of the first twistor-pair to one of the coupling members of the second twistor-pair joint, a second bar element rigidly connected to the other coupling member of the second twistor-pair joint and projecting therefrom, said supporting means, said central and outer coupling members and said first and second bar elements each including a first and second passageway which are separate from each other and which provide communication along the jointed arm for two separated flows of pressurized fluid, and said first and second twistor-pair joints each including a pair of double-acting twistors each having a fluid chamber therein, with the two chambers in each joint forming respective portions of the first and second passageways, and a plurality of insulated flexible electrical conductors extending through the first and second passageways.

* * * * *